US008200041B2

(12) United States Patent
Bookout et al.

(10) Patent No.: US 8,200,041 B2
(45) Date of Patent: Jun. 12, 2012

(54) HARDWARE ACCELERATED SILHOUETTE DETECTION

(75) Inventors: David Bookout, Portland, OR (US); Rahul P. Sathe, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 845 days.

(21) Appl. No.: 12/316,984

(22) Filed: Dec. 18, 2008

(65) Prior Publication Data

US 2010/0158388 A1   Jun. 24, 2010

(51) Int. Cl.
*G06K 9/36* (2006.01)
(52) U.S. Cl. .................. 382/285; 382/199; 382/266
(58) Field of Classification Search ............. 348/653, 348/654, 664, 665, 679, 680; 353/80; 356/613; 382/199, 266, 285
See application file for complete search history.

(56) References Cited

U.S. PATENT DOCUMENTS

| | | | |
|---|---|---|---|
| 5,886,702 A * | 3/1999 | Migdal et al. ................. 345/423 |
| 6,535,219 B1 * | 3/2003 | Marshall et al. .............. 345/581 |
| 6,697,538 B1 * | 2/2004 | Angenent et al. ............. 382/285 |
| 2002/0140702 A1 * | 10/2002 | Koller ........................... 345/582 |
| 2007/0195382 A1 * | 8/2007 | Cho et al. ...................... 358/518 |
| 2008/0024491 A1 * | 1/2008 | Sathe et al. ................... 345/421 |
| 2008/0158225 A1 | 7/2008 | Sathe |
| 2008/0158251 A1 | 7/2008 | Sathe |
| 2008/0294709 A1 | 11/2008 | Sathe |
| 2009/0033659 A1 | 2/2009 | Lake |

* cited by examiner

*Primary Examiner* — Gregory F Cunningham
(74) *Attorney, Agent, or Firm* — Buckley, Maschoff & Talwalkar LLC

(57) ABSTRACT

Disclosed herein are approaches for detecting and/or generating silhouettes, in graphics processing applications, of objects (e.g., convex objects such as polyhedrons).

15 Claims, 5 Drawing Sheets

View Source

HARDWARE ACCELERATED SILHOUETTE DETECTION

BACKGROUND

A polygon mesh is a collection of vertices, edges and faces that defines the shape of a polyhedral object for 3D computer graphics and solid modeling. The faces usually consist of triangles, quadrilaterals or other simple convex polygons, since this simplifies rendering, but may also be composed of more general concave polygons, or polygons with holes. Many popular schemes employ triangular meshes such as strips of triangles (each triangle sharing one edge with one neighbor and another with the next) and/or triangle fans (a set of connected triangles sharing one central vertex). FIG. 1 shows a perspective view of an object 101 with a triangle mesh on its surface. (In this figure, two of the triangles (103), along with their normals N1 and N2, and a view source are shown. for simplicity, the rest of the mesh is not included.)

Silhouette edge detection is used in 3D graphics engines for a number of algorithms including stylized rendering for technical illustrations and shadow determination. Given a position in space (view source, e.g., a person's eyes or a camera), a silhouette edge is an edge shared by two triangles where one triangle faces the view source (N1) and the other faces away (n2). Traditional silhouette edge detection techniques compare the normal of each face, relative to the view source, with the normals of each of neighboring faces. For example, a typical way of silhouette edge detection involves taking the dot product of face normals and the view direction and checking where they change sign. When the sign changes, the edge common to the two compared faces is part of the silhouette. Unfortunately, this approach can be exhaustive, consuming excessive processing and memory resources. Accordingly, new approaches are desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Disclosed herein are approaches for detecting and/or generating silhouettes, in graphics processing applications, of objects (e.g., convex objects such as polyhedrons).

Figure 2A:
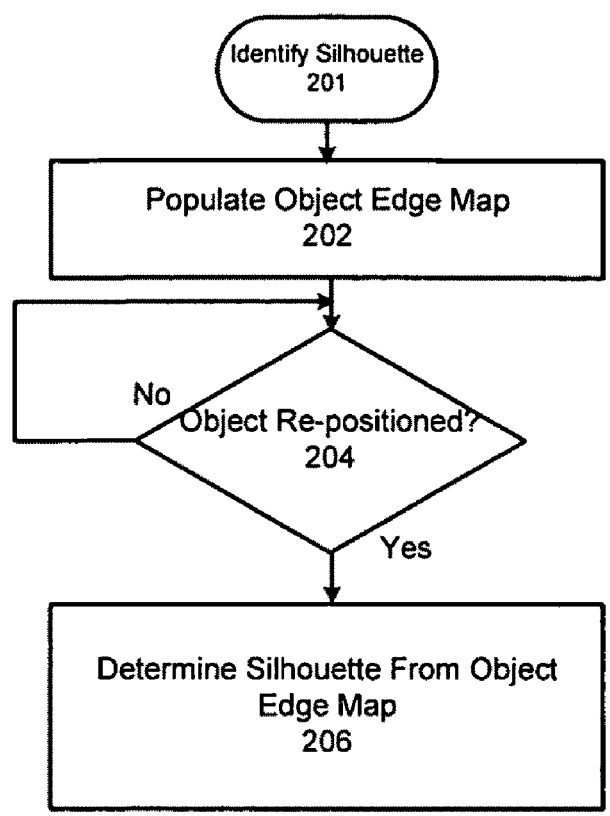
FIG. 2A is a flow diagram of a method for detecting a silhouette for an object.

With reference to FIG. 2A, in accordance with some embodiments, a method for identifying (detecting and/or generating) a silhouette of an object is shown. Initially, at 202, an object edge map is populated with edge normal information for a selected object. Since for a rigid body, vertices generally don't change with respect to center, the object edge map need only be constructed once, e.g., as part of an initialization stage for each unique object, e.g., that is to be rendered by a 3D engine in a graphics processing unit.

At 204, it checks to see if the object is to be re-positioned, i.e., in a graphical display. If not, it loops back upon itself, but if it is to be re-positioned (or otherwise initially positioned or moved in a scene), then at 206 it identifies the silhouette from appropriate object edge map cell information (edge normal information). In some embodiments, it may determine a perspective plane from a desired view for the object and using the generated plane, retrieve edge normal information from the object edge map, which corresponds to the silhouette.

Figure 2B:
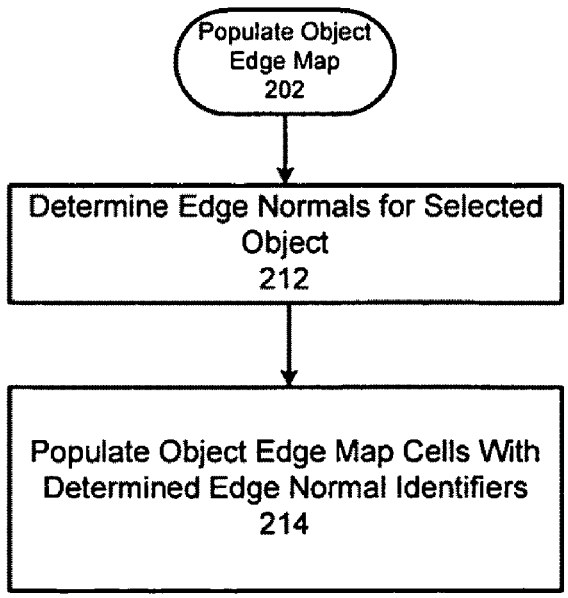
FIG. 2B is a flow diagram showing a method for populating an object map in accordance with some embodiments.

FIG. 2B shows a routine for populating an object edge map in accordance with some embodiments. An object edge map may be any data structure, such as a cube or spheroidal map, that has memory cell locations corresponding to geometric locations relative to a position (or point such as the center or centroid) within the object edge map. For efficiency and ease of understanding, the principles disclosed herein will primarily be discussed using a cube map, but the same principles apply for other suitable volumetric data structures such as spheres, pyramids, etc. A cube map is a collection of six two-dimensional textures, each texture corresponding to a face on a cube and comprising a grid of memory cells (or cells) to store edge normal identifier information.

Figure 1:
FIG. 1 shows an object with a triangular mesh portion.
Figure 1:
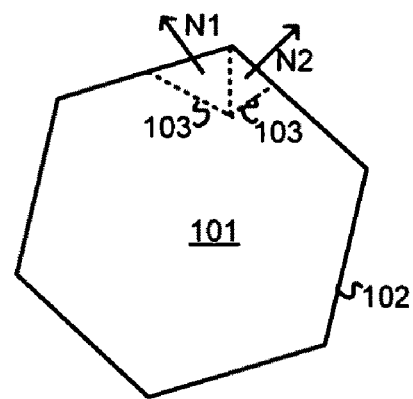
Figure 3:
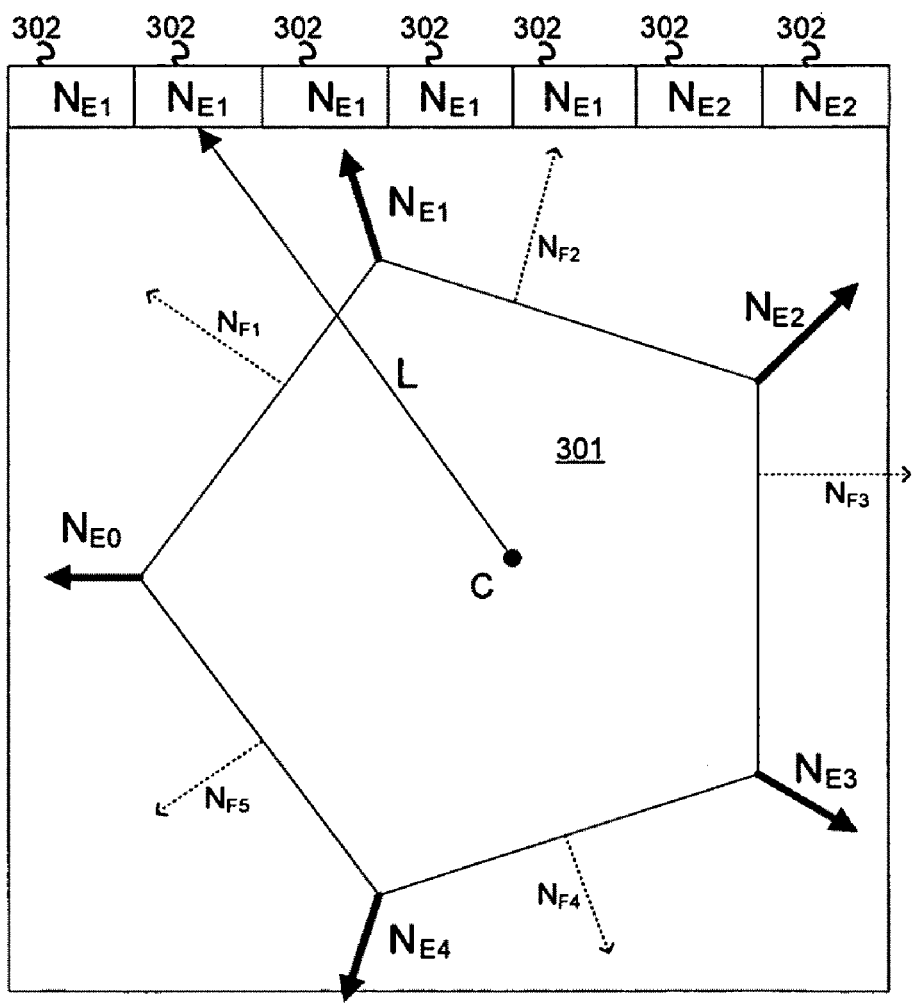
FIG. 3 shows a slice of an object within an object map structure in accordance with some embodiments.

At 212, edge normals for an object are determined. An edge normal is the average of the face normals for the edge common to two triangles in a mesh. So, an object with a mesh of triangles, depending on the triangle resolution (number of triangles), will typically have many edge normals. FIG. 3 shows a slice of an object 301 within an object edge map (cube map in this case). In the depicted figure, $N_{E1}$ is the edge normal for the triangle faces having $N_{F1}$ and $N_{F2}$ as their normals, $N_{E2}$ is the edge normal for the triangle faces having $N_{F2}$ and $N_{F3}$ as their normals, and so on. (Note that as with cube maps being primarily discussed for implementing an object edge map, triangular meshes are used to describe the silhouette detection principles herein, but other mesh shapes including any suitable polygon types, squares, octagons, etc., could be employed as well.)

Returning to the flow diagram of FIG. 2B, at 214, the cells of a utilized object edge map are populated with identifiers for the determined edge normals. Object 301 in FIG. 3 is shown within a cube map. Note that cells 302 for its top side are shown. (Not all of the cells are shown for brevity sake, but it can be appreciated that all six sides would each have an array of cells.) Shown here is simply a line of cells, since this figure is a slice, for a top side.

Each of the depicted cells 302 is populated with edge normal identifiers for edge normals ($N_E$) for each triangle boundary edge. For every sampled direction, from a center point [C] in the cube-map, an identifier for the edge whose normal (edge normal) that matches closest with the direction is stored in the cell corresponding to that direction. That is, the edge whose normal has the largest projection on a cells direction is associated with that cell. As can be appreciated, for a convex object, this will be a one-to-many mapping as an edge normal may be associated with multiple entries in a cube map.

Note that sampling resolution should typically be at least as much as the distribution of edges on a spherical domain. This is because the directions are actually a quantized normal function and there is only one edge per normal for a convex rigid polytope. What this implies is that for a given direction, the cube-map will store the index of the edge that has its' normal most aligned with that direction.

Figure 2C:
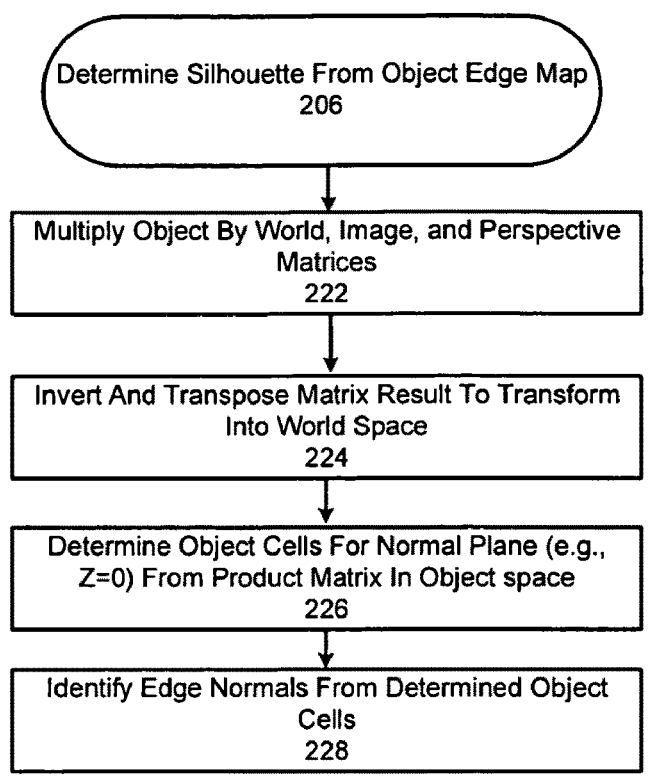
FIG. 2C is a flow diagram showing a method for identifying the edge normals for an object's silhouette in accordance with some embodiments.
Figure 4:
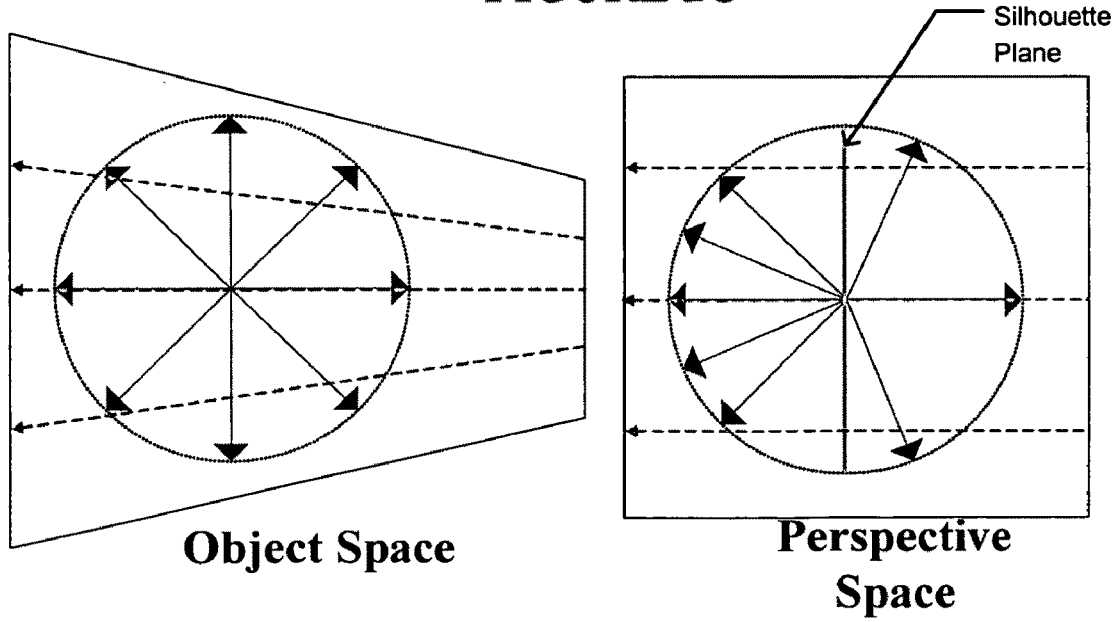
FIG. 4 is a diagram representing the transformation of an object from object to perspective space in accordance with some embodiments.

With reference to FIG. 2C, in accordance with some embodiments, a routine 206 for determining the silhouette from the populated object edge map is shown. At 222, the object (in object space) is multiplied by the world matrix (or equivalent), view matrix (or equivalent), and the perspective matrix (or equivalent), which results in the object being transformed into perspective space. (World, image, and perspective matrices or transformations are commonly known and understood but may be referred differently, depending for example on vender-specific terminology. So while these terms are used for explanation, the inventive embodiments should not be limited by these literal terms.) The perspective transformation scales the view frustum so that the near plane and the far plane are of the same (or approaching the same) size and are unit squares. This is graphically illustrated in FIG. 4, which shows what happens to a uniform normal field after perspective transformation.

Unlike the other transforms (world, view), the perspective function is a non-rigid transform, i.e. when the transformation is applied, angles between lines and lengths of lines change. Due to this, objects are distorted such that parts of the objects that are closer to the view source (e.g., camera) get scaled to a bigger size and the parts that are farther away reduce in size. In the right-hand side portion of FIG. 4, it can be seen that the silhouette occurs at the points where the Z components (assuming Z axis is normal to the view source) of the normals change sign.

Figure 5:
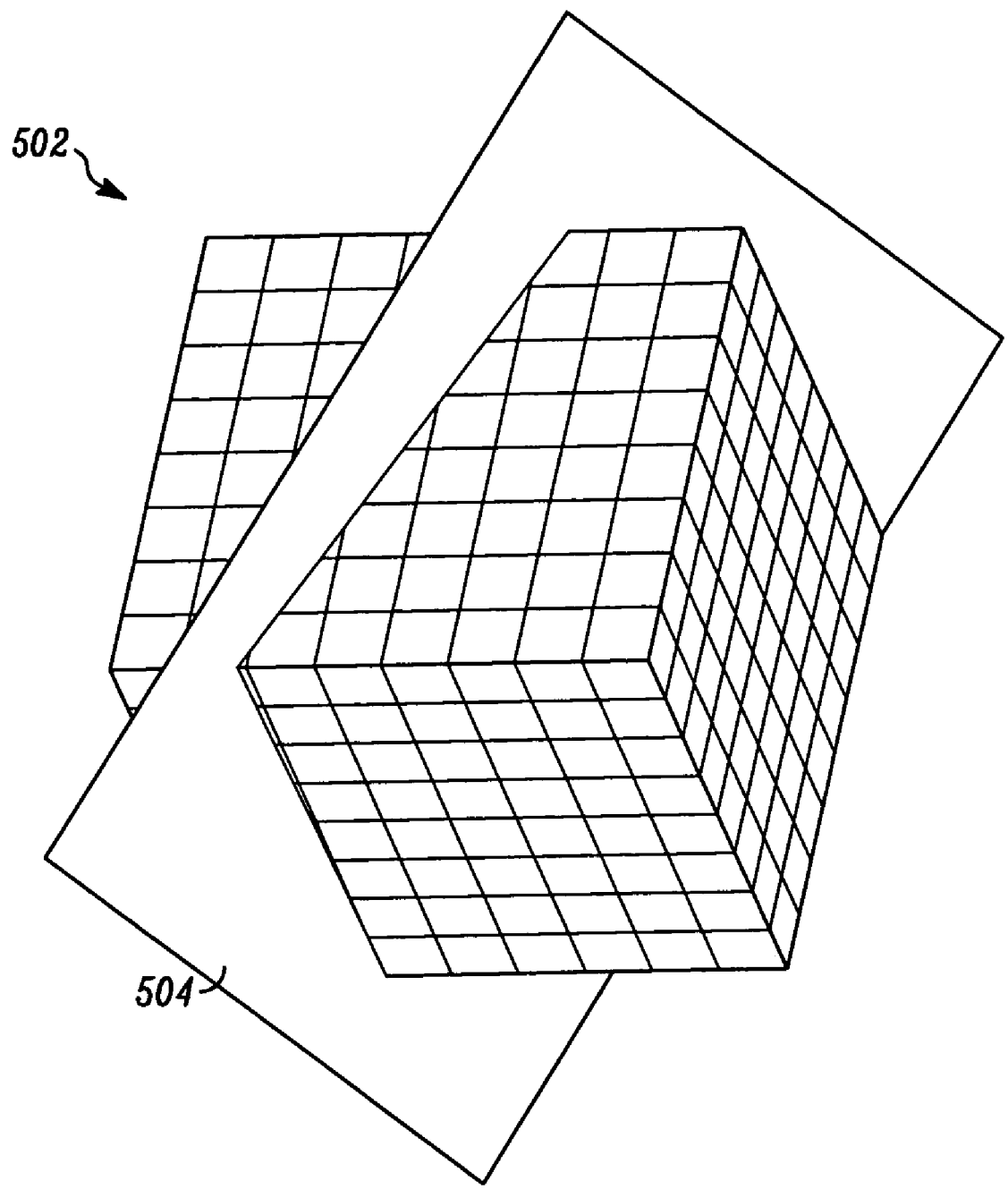
FIG. 5 is a diagram showing identification of a view normal plane in an object map for identifying a silhouette in accordance with some embodiments.

At 224, the resulting matrix, which is in perspective space, is inverted and transposed to place it into world space, making it relatable with the object edge map (e.g., cube map). At 226, directions in the cube map where Z is 0 (or sufficiently close thereto) are determined. This corresponds to the silhouette plane that was previously determined, and this step is graphically represented in FIG. 5. This results in a set of directions for the object edge map that corresponds to a silhouette in the original model space. So, at 228, the edge normals from these object edge map cells are identified and, e.g., used to "read-in" the edges corresponding to the silhouette.

There may be several advantages associated with some embodiments disclosed herein. In some systems, accesses to object edge map (cube map) data are often hardware accelerated, which is exploited by the disclosed methodology. In addition, the actual generation of silhouettes can be accelerated using SIMD (single instruction, multiple data) vector instructions. Moreover, in some embodiments, the edges actually belonging to the silhouette are found, which may reduce calculations. This saves on the bandwidth by finding the edges that actually belong to the silhouette and thus transferring the required data. It also may avoid the branch and keep vector utilization high. Furthermore, it may be more beneficial in cases where multiple instances of unique objects are used because only one edge-normal-map may be needed for all the instances for each object, thereby improving bandwidth utilization even more.

Figure 6:
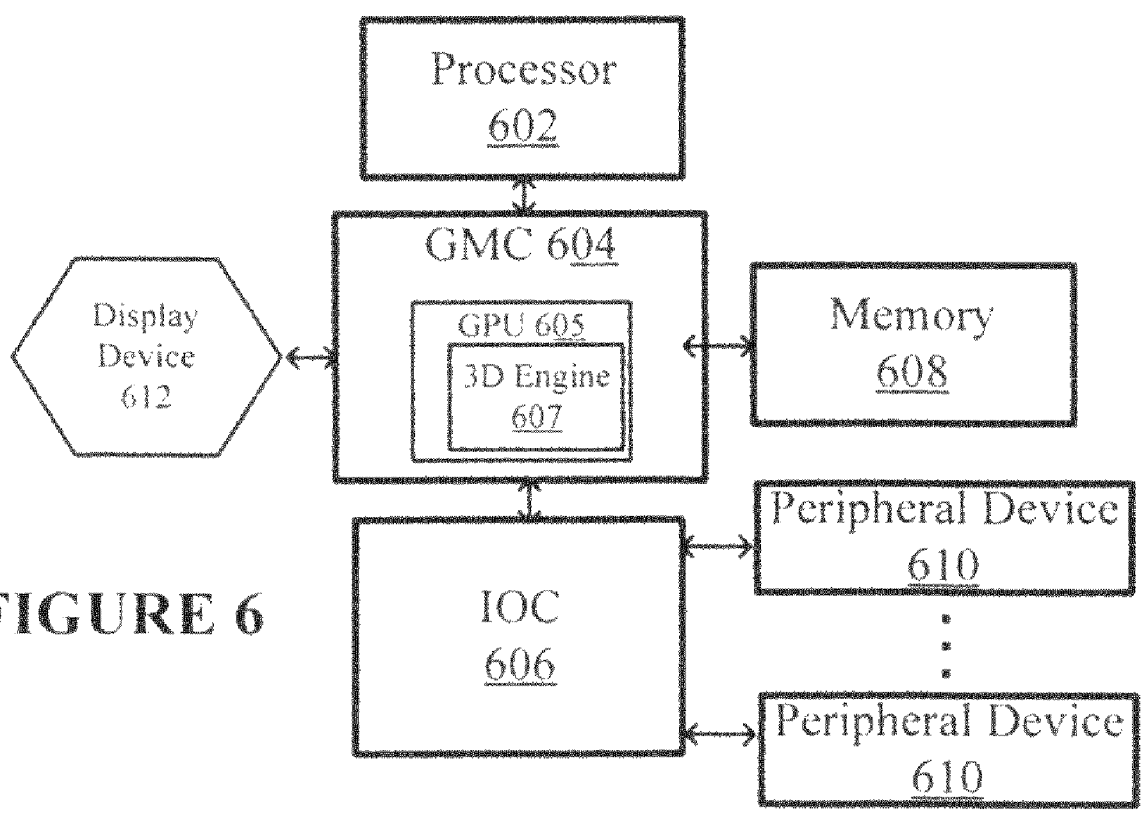
FIG. 6 is a block diagram of a computer system having a 3D engine with silhouette detection capabilities in accordance with some embodiments.

FIG. 6 shows a portion of an exemplary computing system. It comprises a processor 602 (or central processing unit "CPU"), a graphics/memory controller (GMC) 604, an input/output controller (IOC) 606, memory 608, peripheral devices/ports 610, and a display device 612, all coupled together as shown. The processor 602 may comprise one or more cores in one or more packages and functions to facilitate central processing tasks including executing one or more applications.

The GMC 604 controls access to memory 608 from both the processor 602 and IOC 606. It also comprises a graphics processing unit 605 to generate video frames for application(s) running in the processor 602 to be displayed on the display device 612.

The IOC 606 controls access between the peripheral devices/ports 610 and the other blocks in the system. The peripheral devices may include, for example, peripheral chip interconnect (PCI) and/or PCI Express ports, universal serial bus (USB) ports, network (e.g., wireless network) devices, user interface devices such as keypads, mice, and any other devices that may interface with the computing system.

In some embodiments, a 3D engine 607 is included within the graphics processing unit 605. The 3D engine 607 has a silhouette generation capability (software and/or hardware) for generating (or detecting) object silhouettes, as discussed above.

It should be appreciated that while in the depicted embodiment, a 3D engine 107 with silhouette detection functionality is part of a GPU, it may alternatively be included in any other or combinations of GPU and other computing system blocks. Similarly, it should be appreciated that in the depicted embodiment, graphics, memory and I/O controller functionality are implemented in chips separate from the processor chip, but they may also be implemented in a common chip or common integrated circuit (IC) package (e.g., in a system on chip, SOC, implementation) with different combinations of each other and thus, the invention is not limited to any particular chip or chip combination.)

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

The invention is not limited to the embodiments described, but can be practiced with modification and alteration within the spirit and scope of the appended claims. For example, it should be appreciated that example sizes/models/values/ranges may have been given, although the present invention is not limited to the same. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip, comprising:
a graphics processing unit to identify a silhouette for an object using an object edge map populated with edge normal information, wherein the object edge map has cells distributed around the object, each cell storing an edge identifier for an edge whose normal most closely projects through the cell.

2. The chip of claim 1, in which the object has a triangular mesh.

3. The chip of claim 1, in which the object edge map is a cube map.

4. The chip of claim 1, in which the object edge map is a spherical map.

5. A chip, comprising:
a graphics processing unit to identify a silhouette for an object using an object edge map populated with edge normal information, in which the graphics processing unit is to transform an object into perspective space in identifying its silhouette.

6. The chip of claim 5, in which the graphics processing unit is to invert and transpose the perspective space object to transform it back into object space.

7. The chip of claim 6, in which the graphics processing unit is to identify cells in the object edge map whose directions correspond to a silhouette plane from the perspective space object.

8. A method, comprising:
storing in each cell of an object edge map data structure an identifier for the edge of an object whose normal projects closest to the cell; and
identifying a silhouette for the object by identifying edge information in the object edge map that corresponds to a silhouette plane.

9. A method, comprising;
populating an object edge map data structure with edge information for an object;
identifying a silhouette for the object by identifying edge information in the object edge map that corresponds to a silhouette plane; and
multiplying the object by world, image and perspective matrices resulting in a perspective space object.

10. The method of claim 9, comprising inverting and transposing the perspective space object matrix.

11. The method of claim 10, comprising using directions in the transposed and inverted matrix corresponding to a silhouette plane to identify cells in the object edge map having edges for the silhouette.

12. A computer system, comprising:
a display device; and
a chip having a graphics unit to generate video for the display, the graphics unit including a 3D engine that can identify a silhouette for an object using an object edge map populated with edge normal information, wherein the object edge map has cells distributed around the object, each cell storing an edge identifier for an edge whose normal most closely projects through the cell.

13. The system of claim 12, in which the object has a triangular mesh.

14. The system of claim 12, in which the object edge map is a cube map.

15. The system of claim 12, in which the object edge map is a spherical map.

* * * * *